Aug. 9, 1938.   K. C. D. HICKMAN ET AL   2,126,467
DISTILLATION PROCESS
Filed Jan. 31, 1936     2 Sheets-Sheet 1

Kenneth C. D. Hickman
& John C. Hecker,
INVENTORS

BY Newton M. Perrins
Henry S. Boynton
ATTORNEYS.

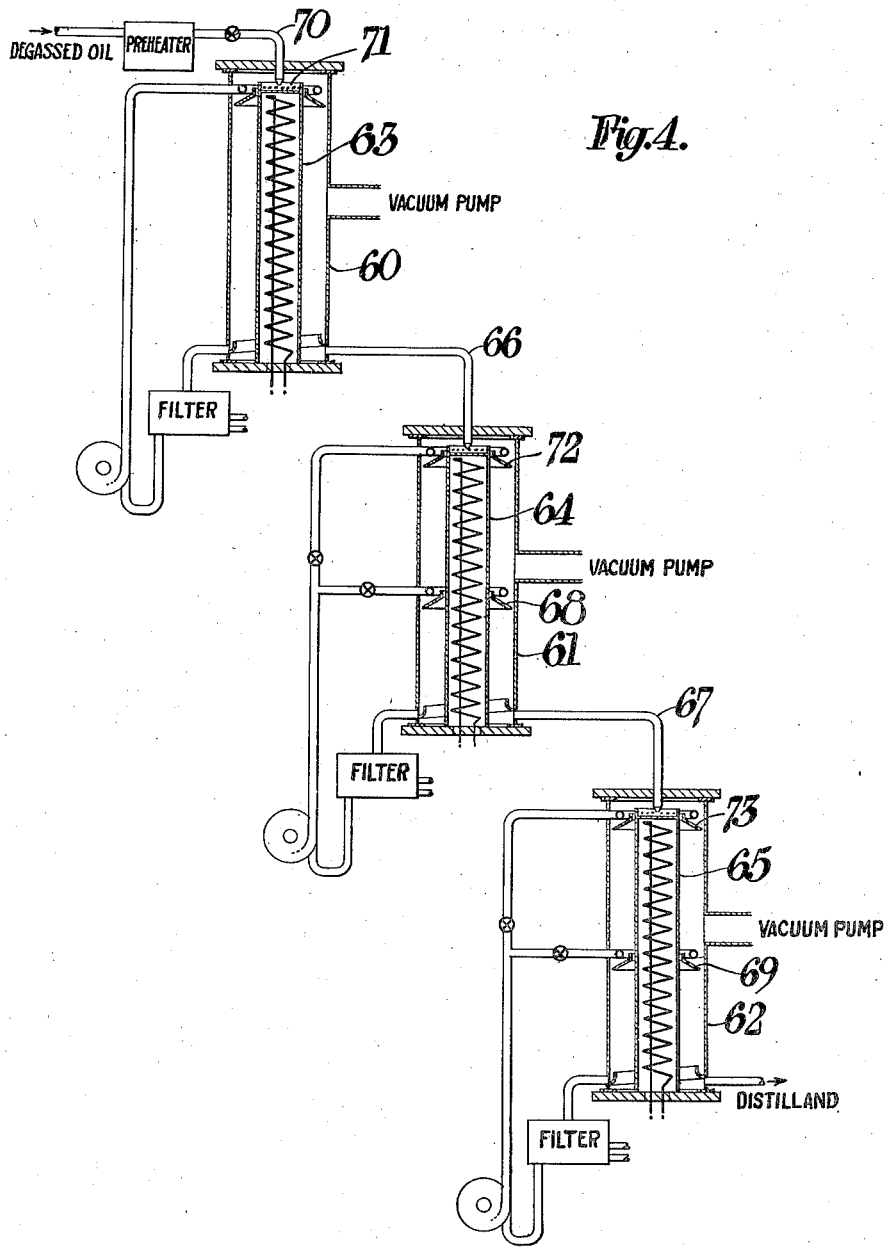

Patented Aug. 9, 1938

2,126,467

UNITED STATES PATENT OFFICE 2,126,467

DISTILLATION PROCESS

Kenneth C. D. Hickman and John C. Hecker, Rochester, N. Y., assignors, by mesne assignments, to Eastman Kodak Company, Jersey City, N. J., a corporation of New Jersey Application January 31, 1936, Serial No. 61,790

10 Claims. (Cl. 202—52)

This invention relates to processes of high vacuum distillation and more particularly to the removal of distillates from condensing surfaces of high vacuum stills.

High vacuum distillation processes have been known for a considerable period of time. Brown in "Proceedings of the Chemical Society" vol. 25-26 (1909-10) pp. 149 and 150 discloses the high vacuum distillation of fats and fatty acids. Burch U. S. Patent 1,955,321 discloses the molecular distillation of high boiling hydrocarbons. In U. S. Patents 1,925,559 and 1,942,858 to Hickman is disclosed the molecular distillation of natural oils, especially fish oils, to obtain distillates containing therapeutic agents, such as vitamins in highly concentrated form. Processes of high vacuum distillation have been applied to the treatment and purification of numerous other types of oils to concentrate material contained therein such as sterols, hormones, etc. The reason for resorting to the use of high vacuum in such processes is to reduce the temperature at which distillation occurs. It happens that distillates coming over under these conditions are often solids, or extremely viscous liquids. Obviously, when such viscous or solid material is condensed upon a cool condensing surface it tends to remain where condensed and results in clogging of the apparatus. In processes of molecular distillation, especially where therapeutic materials, such as vitamins or hormones are distilled, a satisfactory removal of the distillate is of considerable importance.

A characteristic of molecular distillation is that the distillate is condensed upon a surface located at a distance of less than approximately the mean free path of the molecules of residual gas in the distillation chamber. In such processes the condensing surface is disposed opposite the distilling surface and their areas are approximately the same. As the desired fraction, or fractions, are usually only a small proportion of the original oil, often only 1/10% to 2%, it is apparent that the removal of such a small volume spread over a large surface presents almost insurmountable difficulties. This is especially true when the distillate is in a viscous or solid state at the temperature of the condensing surface. Distillates also often contain materials which crystallize on the condensing walls and mechanically retain the liquid portion so that the distillate flows out many thousand times more slowly than is desirable. The problem is particularly troublesome when distilling fish oils, such as cod liver oil, to concentrate their vitamin content. The vitamins are present in very small amounts and therefore the desired distillate is correspondingly small. To add further to the problem cholesterol distills over with the vitamin D fraction and, as cholesterol is a solid melting at 145° C., it crystallizes on the condensing surface, retaining a considerable portion of the desired vitamin.

Resort has been made to the expedient of heating the condensing surface in order to melt solids condensed on it or to lower the viscosity of the condensate. This is undesirable for a number of reasons. A heated surface is less efficient as a condenser. The application of heat raises the vapor pressure of the distillate so that it is partially vaporized and lost and the molecules thus driven off collide with those coming from the distilling surface and prevent them from reaching the condensing surface. Where the distilling vapors are not efficiently condensed and where the condensed materials are revaporized, the vapors tend to enter the vacuum pump, usually a condensation pump, and thus place an undesirable burden upon it. Furthermore, where heat sensitive materials such as vitamins are being concentrated, this additional heating step effects at least partial destruction of the desired fraction.

The present invention has for its object to overcome the deficiencies of hitherto known vacuum distillation processes and to provide a process whereby distillates may be removed from the condensing surface without adversely affecting their value. A further object is to remove the distillates without employing expedients which tend to cause decomposition. A still further object is to remove the distillates obtained in molecular distillation processes without adversely affecting the distillation rate and without loss in amount of distillate obtained. Another object is to provide apparatus which makes possible faster removal of distillate. Other objects will appear hereinafter.

These objects are accomplished by the following invention which, in its broader aspects, comprises flowing a liquid of low vapor pressure over the condensing surface to entrain and remove the distillate. The entraining liquid may be either the distillate itself or a foreign liquid and may be re-cycled any number of times, preferably after removal of solids by cooling or other means.

In a variation of the process the distillation is carried out in a chamber in which the evaporating surface surrounds the condensing surface, thus providing a smaller area for the condensate with resultant increase in rate of drainage.

In the following examples and description we have set forth several of the preferred embodiments of our invention, but it is to be understood that they are included merely for purposes of illustration and not as a limitation thereof.

In carrying out our invention we flow a liquid entraining agent over the condensing surface in order to entrain and rapidly carry away the distillate. The liquid is preferably cooled before admission to the distillation zone, thus avoiding reevaporation or thermal destruction of the distillate as well as avoiding the necessity of strongly cooling the condenser by other means. The liquid used must have a low vapor pressure under the conditions used so that it will not vaporize on admission to the distillation zone and thus hinder the distillation process. On the other hand, there is no lower limit of vapor pressure, since the lower the pressure, the less will be the possibility of undesirable vaporization. Instead of using a foreign entraining agent, the distillate itself may be used for the same purpose. In both cases the liquid drawn off is preferably treated by cooling or by other equivalent means such as solvent extraction, addition of a non-solvent or chemical reactants to remove solid materials such as cholesterol before being recirculated over the condensing surface.

Due to continued recycling the entraining agent will have accumulated a considerable amount of the desired distillate and when the concentration becomes sufficiently high it may be removed and the distillate recovered therefrom by freezing, precipitation with non-solvents or subjected to molecular distillation to recover the desired material and the entraining agent re-used. Of course, where the distillate itself is used as the entraining agent, such recovery is unnecessary, since the distillate is obtained in highly concentrated form free of solid materials and foreign substances.

To simplify the disclosure we will describe the process as carried out in the distilling apparatus illustrated in the accompanying drawings, in which:

Fig. 4 illustrates a side elevation of a multi-stage still in which stills 61, 62, and 63 are shown in section.

It is to be understood that the process can be carried out with other types of distillation apparatus and that the particular types selected are given merely for the purposes of illustration.

Figure 1:
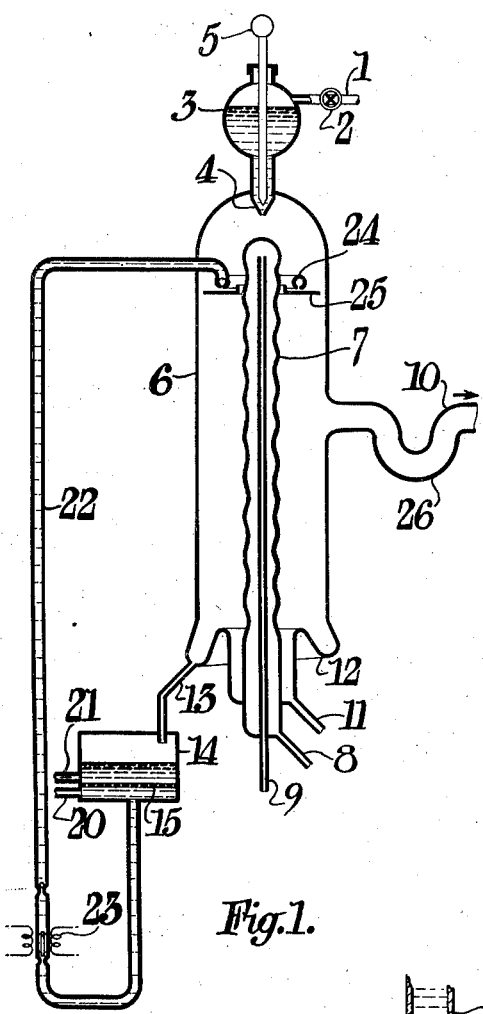
Fig. 1 illustrates in diagrammatic form a cross-sectional elevation of a molecular still having the heating surface surrounded by the condensing surface.

Referring to Fig. 1, reference numeral 1 indicates an inlet pipe equipped with valve 2 through which liquid to be distilled is delivered into reservoir 3 which is provided with outlet valve 4 provided with valve controlling means 5. Numeral 6 designates a still of cylindrical form, having distilling element provided with a roughened or spirally corrugated heating surface 7 concentrically disposed therein and heated by circulation of heated fluid through pipes 8 and 9. The inside surface of 6 acts as a condensing surface and is shown as being air cooled, although cooling means may be applied thereto if desired.

Conduit 10, provided with vapor trap 26, is connected to a high vacuum pump (not shown) in order to evacuate the space between the condensing surface 6 and the evaporating surface 7. Undistilled residue flowing down surface 7 is withdrawn through conduit 11. Trough 12 serves to collect distillate flowing down wall 6 and deliver it through pipe 13 into container 14, provided with filter 15 and withdrawal pipes 20 and 21. Conduit 22 provided with magnetically operated pump 23 serves to deliver filtered liquid to distributing head 24 which is disposed concentrically to, but out of contact with, heating column 7. Distributing plate 25 is disposed in the same manner as head 24 and serves to evenly distribute the liquid flowing from 24 over the condensing surface 6.

Figure 3:
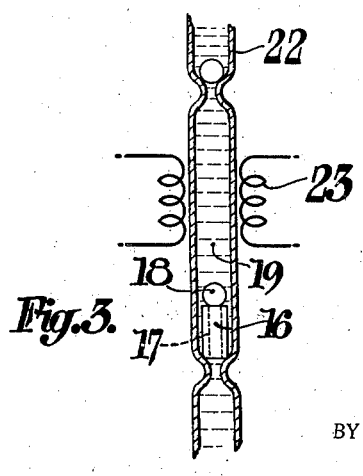
Fig. 3 is an enlarged view of magnetic pump 23 shown in Fig. 1.

Fig. 3 is an enlarged view of magnetic pump 23 shown in Fig. 1. Reference numeral 16 designates a magnetically actuated plunger provided with a longitudinal opening 17 and ball valve 18. Solenoid 23 actuates plunger 16 which on its upward stroke forces the liquid before it. On its downward stroke liquid flows through opening 17 into chamber 19 by partially displacing ball 18 and the cycle is repeated.

Figure 2:
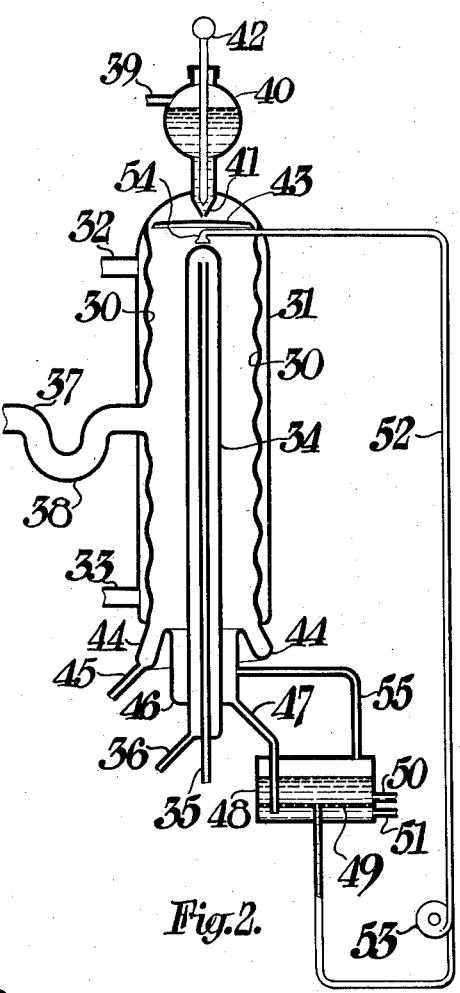
Fig. 2 is a similar still in cross-sectional elevation, but having the condensing surface surrounded by the evaporating surface.

Referring to Fig. 2, numeral 30 designates a spirally corrugated evaporating surface, provided with a heating jacket 31 having openings 32 and 33 for circulation of an appropriate heating fluid. Numeral 34 designates a condensing surface cooled by circulation of cooling fluid through conduits 35 and 36. Conduit 37, provided with trap 38, communicates with a high vacuum pump (not shown) which evacuates the space between the evaporating and condensing surfaces. Numeral 39 designates an inlet pipe for delivering liquid to be distilled to reservoir 40, the latter being provided with valve 41 and valve actuating means 42. Distributing plate 43 serves to evenly distribute distilland onto the evaporating surface 30. Undistilled residue is collected by trough 44 and withdrawn through conduit 45. Distillate flows down the surface of column 34 into trough 46 and thence through pipe 47 into container 48 provided with filter 49 and withdrawal pipes 50 and 51. Filtered liquid is withdrawn through pipe 52 by pump 53 and delivered to the distributing device 54. Reference numeral 55 designates a conduit for equalizing the pressure in the filter and still.

Referring to Fig. 4 reference numerals 60, 61 and 62 designate still casings provided with electrically heated evaporating columns 63, 64, and 65, respectively. Conduits 66 and 67 connect the stills in series. Stills 60, 61, and 62 are each provided with filters and means for recirculating entraining liquid in the same manner as shown in detail in Fig. 1. Stills 61 and 62 are provided with auxiliary distributing heads 68 and 69, respectively, to enable the circulation of entraining liquid at more than one place, if desired.

In operation, employing the apparatus of Fig. 1, liquid to be distilled, such as cod-liver oil, is delivered to pipe 1, preferably after it has been degassed by the method disclosed in U. S. Patent 1,942,858, through valve 4 and onto the evaporating surface 7 which is heated by circulating a heated fluid such as diphenyl or steam through pipe 8 and withdrawn through pipe 9. The space enclosed by condensing surface 6 is evacuated through pipe 10 equipped with vapor trap 26. The oil flows down the heated evaporating surface 7 and the vapors given off are condensed upon the condensing surface 6.

The condensate flows down the surface 6 into the trough 12 and through pipe 13 into container 14. The container 14 is preferably chilled to separate solids which deposit on filter 15. The liquid flows to the bottom of container 14 and is withdrawn through pipe 22 by means of the magnetically operated pump 23 and circulated through the distributing head 24.

The undistilled residue is withdrawn through conduit 11. When a foreign entraining liquid is used, it may be supplied to container 14, preferably before distillation starts and in a degassed condition, if desired.

In carrying out my process employing the apparatus of Fig. 2, the oil to be distilled flows from container 40 onto the plate 43 thence to evaporating surface 30 provided, as described, with spiral corrugations which prevent the oil from gathering in streams and causes the oil to be evenly distributed over the surface down which it flows by gravity into trough 44 and thence into conduit 45.

During distillation, the vapors are condensed upon the cooled condensing surface 34. The condensate flows by gravity down the walls of 34 into a collecting chamber 46 and thence by pipe 47 into container 48. Solids are precipitated in container 48, provided with cooling means (not shown) and are removed from the liquid by filtration. Filtered liquid free of solids is withdrawn through pipe 52 by means of pump 53 and delivered to nozzle 54 which distributes the recycled liquid evenly over the condensing surface. When it is desired to remove the circulated liquid or excess distillate it may be withdrawn through pipe 50.

Disposing the condensing surface inside the evaporating surface results in the distillate being condensed upon and spread over a smaller area so that the rate of drainage is substantially increased and the amount of entraining liquid necessary to remove the distillate is correspondingly less.

In operation, employing the apparatus of Fig. 4, oil, degassed in accordance with the process disclosed in the Hickman application Serial No. 48,691, filed November 6, 1935, is delivered to the preheater and flows through conduit 70 into the basin 71 at the top of heating element 63. Basin 71 is provided with holes in the periphery thereof so that the oil flows down the heated surface of 63 and is thus raised to distillation temperature. It is desirable to have evaporating columns 63, 64, and 65 heated to progressively higher temperatures in order to enable removal of different fractions in each still. Distillate condensed on the inside walls of casing 60 is removed by entraining liquid circulated thereover in the same manner as described in detail in connection with Fig. 1. Undistilled residue flows through conduit 66 onto evaporating column 64 where it is heated to a still higher temperature and an intermediate fraction condensed on walls 61 and removed by entraining liquid circulated through distributing heads 72 and/or 68. The remaining distilland flows through conduit 67 onto evaporating surface 65 heated to a higher temperature to enable removal of a final high-boiling fraction. Condensate is removed from the inside walls of 62 by entraining liquid circulated through distributing heads 73 and/or 69. Since high-boiling fractions, often of a viscous nature, are removed in stills 61 and 62, it is desirable to circulate entraining liquid at more than one point, as shown in the figure.

*Example 1.*—Cod-liver oil is subjected to molecular distillation at between 90° and 220° C. and at a residual gas pressure of about 1 micron in an apparatus similar to that illustrated in Fig. 1, the apparatus being so constructed that the condensing surface is located at a distance from the evaporative surface of about 1 inch. Ethyl hexyl phthalate is caused to flow down the walls of the condensing surface at a temperature such that a mixture of liquids (entraining liquid and condensate) leaves the apparatus at a temperature of less than 60° C. The liquid containing the distillate is drawn off and chilled while still under the reduced pressure of the still. The liquid is filtered to remove precipitated solid material, which is mostly cholesterol, and the liquid again circulated in chilled and degassed condition over the condensing surface. When it is deemed to have accumulated sufficient vitamins A and D, it is removed and fractionated separately by molecular distillation or other means to recover the vitamin content. The ethyl hexyl phthalate may then be returned to the original still for re-use.

*Example 2.*—Cod liver oil is subjected to distillation under the same conditions set forth in Example 1, but instead of using a foreign entraining agent, the condensate itself is recirculated over the condensing surface after chilling and filtering to remove solids. In this way it is possible to keep the walls wetted with a larger and more rapidly moving stream of distillate which is substantially free from solid material. A concentrate of high vitamin content, free of solids, is obtained.

Processes of molecular distillation are those occurring under such high vacuum conditions that a high proportion of the vaporized molecules do not return to the evaporative surface and are condensed upon a surface located at a distance of less than about the mean free path of the molecules of residual gas present in the distillation chamber. This distance is directly proportional to degree of vacuum. The path also varies according to the temperature and the molecular character of the distilling vapor, but an oil molecule may be considered to have a mean free path of approximately 2 inches in a residual atmosphere of air at 1 micron at the temperature of distillation. We therefore contemplate using evaporating and condensing surfaces situated within 1 inch at a residual gas pressure of less than 3 microns, or within a quarter of an inch at less than 8 microns, or within 10 inches at less than .3 micron, and so forth.

It is desirable to use a pressure of less than 100 microns and preferably less than 10 such as, for instance, about 1 micron. However, with pressure and distance as interchangeable quantities we are able to place no lower limit to the pressure or upper limit to the distance, but for reasons of expediency we prefer not to operate with a residual pressure of less than .01 micron or a distance of more than 10 feet.

In selecting the temperature to be used consideration must be given to the character of the material to be distilled and the pressures used. Materials of very low volatility must be heated to temperatures approaching their decomposition point even though the lowest pressures attainable are employed. With such compounds temperatures as high as 325° C. are useful. On the other hand the separation of easily volatilizable compounds can be effected at low temperatures such as at room temperature or slightly higher such as up to about 70° C. Most materials have vapor pressures intermediate these two extreme types and we have found that they may be satisfactorily distilled at temperatures of 70° to 300° C. and usually at lower temperatures of between 70° and 250° C. The latter range and especially those temperatures between 90° and 230° C. have been found to be most satisfactory for the distillation of vitamins from vitamin containing oils.

While we have described our invention as applied to molecular distillation it is also applicable to other types of high vacuum distillation processes where a troublesome problem of removal of distillate is encountered. The invention is, however, especially useful in molecular distillation, since the condensing surfaces are necessarily large and are closely adjacent to the evaporative surface making the problem of distillate removal particularly difficult.

For the purpose of convenience we have described our invention by reference to cod liver oil. However, the process is applicable to the high vacuum distillation of any materials which give a viscous and/or solid distillate which will not readily flow from the condensing surface. Thus it may be employed in the distillation of animal and vegetable oils generally, such as those of the tuna fish family, swordfish, salmon, dogfish, seal body and liver oils, mackerel, herring, sardine menhaden body oils, halibut, turbot, sole etc. liver oils; corn, wheat germ, linseed, hydrocarbon oils and the like. The process is also applicable to the recovery of hormones from oily concentrates, to the removal of sterols from mixtures containing them and to the distillation of vitamin concentrates obtained by purification and saponification of natural vitamin containing oils.

The invention is especially useful when solid materials are to be distilled. The difficulties of molecular distillation of solid materials have arisen mainly because of the problem of removal of the solid distillate from the condensing surface. By means of our invention the solid substance may be dissolved or dispersed in an oil of low volatility and distilled or the solid may be melted or mechanically dispersed in finely divided condition on the evaporating surface. The solids collecting on the condensing surface may then be readily removed by flowing the entraining liquid thereover in the manner described above.

There are no real limits to the boiling point at atmospheric pressure of the entraining liquids used. They should have a low vapor pressure under the conditions of temperature and pressure used, such as a vapor pressure of less than 1 micron at the temperature of the condensing surface. If the surface is to be held at 100° C. then an entraining agent as involatile as castor oil would be needed. If, however, the condenser were surrounded by dry ice, a normally volatile liquid (as volatile even as acetone) could be used. The temperature of the condensing surface must, of course, be maintained at a value low enough that the normally volatile liquid does not have an appreciable vapor pressure. The use of such normally volatile liquids is often desirable when solids are distilled, since a better solvent action is possible. If the entraining liquid is miscible with the distillate, or is a solvent therefor, rapid and complete removal from the condensing surface results and it is, therefore, preferable to select an entraining liquid which has an appreciable solvent action on the distillate. However, those which have only a partial solvent action on, or are immiscible with the distillate may be used, since the mechanical or washing action will in many cases effect a desirable removal of the distillate. Entraining agents may be selected which are solvents for the distillate under the temperature conditions used, but are non-solvents when cold or chilled. By means of this expedient the entraining liquid and distillate can be substantially separated by merely cooling after withdrawal from the distillation zone. Glycerin and polyglycerols can be effectively employed in this manner when fat-soluble vitamin-containing distillates are recovered.

Any organic liquid may be used as the entraining agent as long as it fulfills the above requirements. Examples of classes of liquid found to be particularly suitable are hydrocarbons, mineral oils and fractions thereof, esters, especially phthalates of aliphatic alcohols, fatty glycerides, chlorinated hydrocarbons and highly oxygenated compounds. Specific examples are "Nujol", kerosene, cotton-seed oil, triacetin, decalin, acetylene tetrachloride, glycerin, ethyl lactate, di-glycerol and tri-glycerol.

The herein described invention constitutes a simple, economical and highly effective solution of the troublesome problem of removing viscous distillates from the condensing surface of a high vacuum still. By means of our invention the loss of distillate by re-evaporation is substantially decreased and the rate of distillation correspondingly increased. An outstanding advantage of our invention is the substantial decrease in loss of expensive vitamin and other heat-sensitive distillates.

We claim:

1. The process of short path, high vacuum distillation which comprises passing fluid organic material which is ordinarily undistillable by other means without harmful decomposition over a heated surface which is maintained under a high vacuum, condensing vaporized molecules derived from said material upon a condensing surface which is near to the heating surface and which is separated therefrom by substantially free unconstricted space, and circulating over the condensing surface during distillation a liquid having a temperature lower than that of the distilling vapors, which liquid serves as a carrier for but is not chemically reactive with the distillate and which liquid has a vapor pressure sufficiently low at the temperature of the condensing surface and at the pressure prevailing during distillation that the rate of distillation is not substantially diminished.

2. The process of short path high vacuum distillation which comprises passing fluid organic material which is ordinarily undistillable by other means without harmful decomposition over a heated surface which is maintained under a high vacuum, condensing vaporized molecules derived from said material upon a condensing surface which is near to the heating surface and which is separated therefrom by substantially free unconstricted space, and circulating over the condensing surface during distillation a liquid which is miscible but is not chemically reactive with the distillate and which has a vapor pressure sufficiently low at the temperature of the condensing surface and at the pressure prevailing during distillation that the rate of distillation is not substantially diminished.

3. The process of short path, high vacuum distillation which comprises passing fluid organic material which is ordinarily undistillable by other means without harmful decomposition over a heated surface which is maintained under a high vacuum, condensing vaporized molecules derived from said material upon a condensing surface which is near to the heating surface and which is separated therefrom by substantially free unconstricted space, and circulating over the condensing surface during distillation a liquid having a temperature lower than that of the distilling vapors, which liquid is miscible but not chemically reactive with the distillate at the temperature of the condensing surface but substantially immiscible therewith at materially lower temperatures and which has a vapor pressure sufficiently low at the temperature of the condensing surface and at the pressure prevailing during distillation that the rate of distillation is not substantially diminished.

4. The process of short path, high vacuum distillation which comprises passing fluid organic material which is ordinarily undistillable by other means without harmful decomposition over a heated surface which is maintained under a pressure of less than about .1 mm., condensing vaporized molecules derived from said material upon a condensing surface which is near to the heated surface and which is separated therefrom by substantially free unconstricted space, withdrawing condensate from the condensing surface, treating it to remove solid materials and recirculating at least a portion of the remaining liquid over the condensing surface during the distillation, the recirculated liquid having a vapor pressure sufficiently low at the temperature of the condensing surface and at the pressure prevailing during distillation that the rate of distillation is not substantially diminished.

5. The process of evaporative distillation which comprises passing fluid organic material which is ordinarily undistillable by other means without harmful decomposition over a heated surface which is maintained under a high vacuum, condensing vaporized molecules derived from said material upon a condensing surface which is located at a distance from the heated surface of less than about the mean free path and which is separated therefrom by substantially free unconstricted space, withdrawing condensate from the condensing surface, treating it to remove solid components and recirculating at least a portion of the remaining liquid over the condensing surface during the distillation, the recirculated liquid having a vapor pressure sufficiently low at the temperature of the condensing surface and at the pressure prevailing during distillation that the rate of distillation is not substantially diminished.

6. The process of concentrating vitamins contained in an oil by high vacuum, short path distillation which comprises passing the oil over a heated surface which is maintained under a pressure of less than about .1 mm., condensing vaporized vitamin molecules derived from said oil upon a condensing surface which is near to the heating surface and which is separated therefrom by substantially free unconstricted space, and circulating over the condensing surface during the distillation of liquid having a temperature which is lower than the distilling vapors and which is miscible but not chemically reactive with the distillate and which has a vapor pressure sufficiently low at the temperature of the condensing surface and at the pressure prevailing during the distillation that the rate of distillation is not substantially diminished.

7. The process of concentrating vitamins contained in an oil by high vacuum, short path distillation which comprises passing the oil over a heated surface which is maintained under a pressure of less than about .1 mm., condensing vaporized vitamin molecules derived from said oil upon a condensing surface which is near to the heating surface and which is separated therefrom by substantially free unconstricted space, and circulating over the condensing surface during the distillation a liquid having a temperature which is lower than the distilling vapors and which is immiscible but not chemically reactive with the distillate and which has a vapor pressure sufficiently low at the temperature of the condensing surface and at the pressure prevailing during the distillation that the rate of distillation is not substantially diminished.

8. The process of concentrating vitamins contained in an oil by high vacuum, short path distillation which comprises passing the oil over a heated surface which is maintained under a pressure of less than about .1 mm., condensing vaporized vitamin molecules derived from said oil upon a condensing surface which is near to the heating surface and which is separated therefrom by substantially free unconstricted space, and circulating over the condensing surface during the distillation a liquid having a temperature which is lower than the distilling vapors and which is partially miscible but not chemically reactive with the distillate and which has a vapor pressure sufficiently low at the temperature of the condensing surface and at the pressure prevailing during the distillation that the rate of distillation is not substantially diminished.

9. The process of concentrating vitamins contained in a fish oil by molecular distillation which comprises heating a moving film of the oil under a pressure of less than about .1 mm. to a temperature between about 70 and 250° C., condensing vaporized vitamin molecules derived from the fish oil upon a condensing surface which is of approximately the same area as the film of oil and which is located at a distance therefrom of less than about the mean free path, and circulating over the condensing surface during the distillation a liquid having a temperature lower than that of the distilling vapors which liquid is miscible but not chemically reactive with the distillate and which liquid has a vapor pressure sufficiently low at the temperature of the condensing surface and at the pressure prevailing during the distillation that the rate of the distillation is not substantially diminished.

10. The process of concentrating vitamins contained in a fish oil by molecular distillation which comprises heating a moving film of the oil under a pressure of less than about the .1 mm. to a temperature between about 70 and 250° C., condensing vaporized vitamin molecules derived from the fish oil upon a condensing surface which is of approximately the same area as the film of oil and which is located at a distance therefrom of less than about the mean free path, withdrawing condensate from the condensing surface, cooling it to remove solid components contained therein and recirculating at least a portion of the cool remaining liquid over the condensing surface during the distillation, the recirculated liquid having a vapor pressure sufficiently low at the temperature of the condensing surface and at the pressure prevailing during distillation that the rate of distillation is not substantially diminished.

KENNETH C. D. HICKMAN.
JOHN C. HECKER.